Jan. 19, 1932.  R. C. BRADLEY  1,841,568
PISTON TYPE LIQUID METER
Filed Jan. 13, 1928   7 Sheets-Sheet 1

Fig. 1.

Witnesses:

Inventor:
Richard C. Bradley
By R. J. Dearton, Atty.

Jan. 19, 1932.  R. C. BRADLEY  1,841,568
PISTON TYPE LIQUID METER
Filed Jan. 13, 1928  7 Sheets-Sheet 2

Witnesses:

Inventor:
Richard C. Bradley
By R. J. Dearborn Atty.

Patented Jan. 19, 1932

1,841,568

UNITED STATES PATENT OFFICE

RICHARD C. BRADLEY, OF CHICAGO, ILLINOIS

PISTON TYPE LIQUID METER

Application filed January 13, 1928. Serial No. 246,432.

My invention relates to piston type liquid meters and is designed to produce a device of the class described of such extreme accuracy that it can be used in the measuring of such volatile liquids as gasoline, etc.

To this end is consists of a pair of cylinders associated with a common inlet and a common outlet, and pistons and valve mechanism arranged so that during the movement of the pistons in each direction, both of them are drawing a charge from the inlet and forcing a charge through the outlet, together with indicating and registering apparatus to show the amount of liquid being delivered, and at the same time make a permanent count or registration thereof.

To illustrate my invention, I annex hereto seven sheets of drawings, in which the same reference characters are used to designate identical parts in all the figures, of which,—

Figure 4:
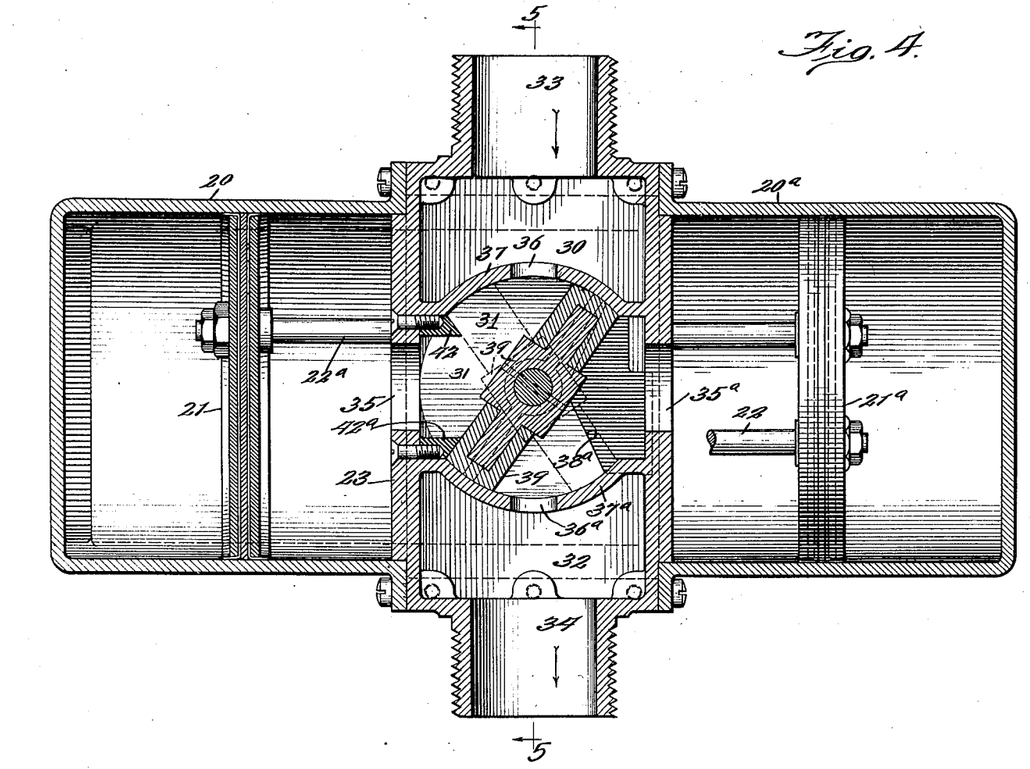
Fig. 4 is a horizontal section on the line 4—4 of Fig. 3.
Figure 6:
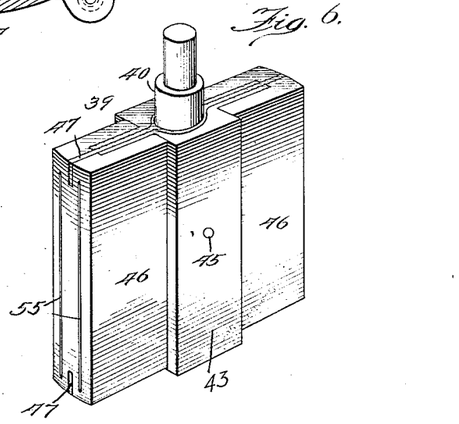
Fig. 6 is a perspective view of the valve.
Figure 7:
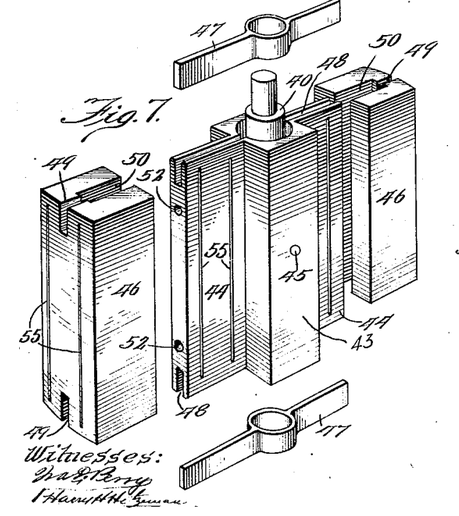
Fig. 7 is a similar view of the valve, with the various elements separated more clearly to show their construction.
Figures 8, 12, 13, 18:
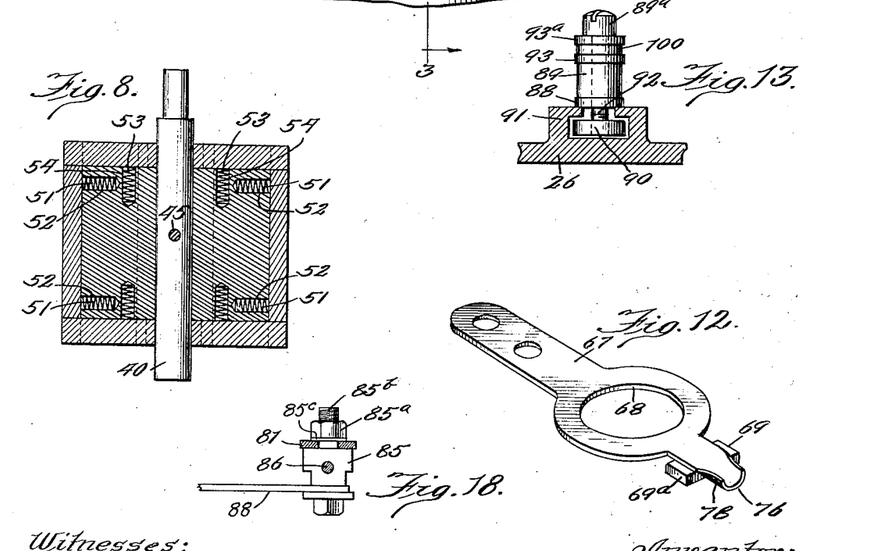
Fig. 8 (Sheet 2) is a central vertical section taken through the valve lengthwise.
Fig. 12 (Sheet 2) is a perspective view of a leaf-spring catch.
Fig. 13 is a detail in section, on a larger scale, on the line 13—13 of Fig. 2.
Fig. 18 is a view on line 18—18 of Fig. 2.
Figure 9:
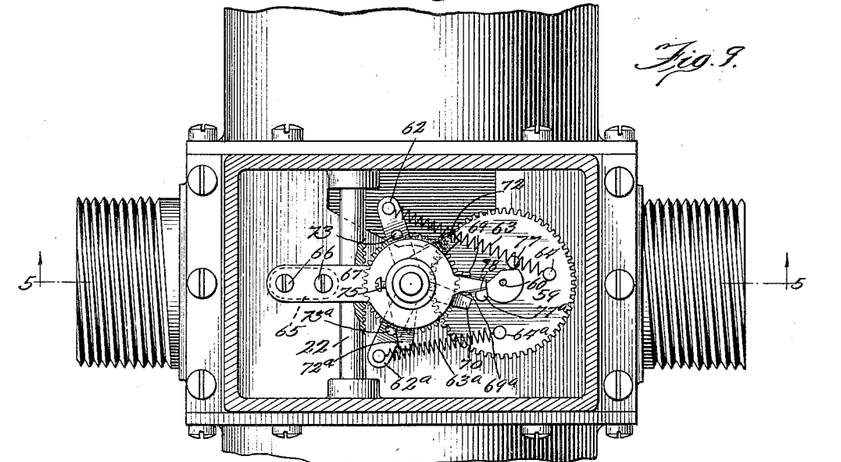
Fig. 9 is a fragmentary plan view in section on the line 9—9 of Fig. 5.

In carrying out my invention in its preferred form, I employ a pair of measuring cylinders 20 and 20$^a$, preferably circular in their operative cross-section and provided with a pair of pistons 21 and 21$^a$ connected to move together in the same direction by the piston rods 22 and 22$^a$. Between the adjacent open ends of the cylinders is interposed the valve-chamber casting 23, below which is the lower-chamber casting 24, and above which is the upper-chamber casting 25, which has its upper end closed by the generally circular base-casting 26 for the circular casing 27 which contains the registering and indicating mechanism. The cylinder 20 has formed at its bottom and outside of the true cylindrical portion a passage 28 leading from its outer end to a correspondingly shaped opening 29 formed in the adjacent end of the lower-chamber casting 24, and the cylinder 20$^a$ has formed at its top a passage 28$^a$ leading from its outer end to a correspondingly shaped opening 29$^a$ formed in the adjacent end of the upper-chamber casting 25. The valve-chamber casting 23 is divided into three chambers 30, 31 and 32, the inlet chamber 30 being provided with the threaded nipple 33 constituting the inlet for the liquid to be measured, while the outlet chamber 32 is provided with the threaded nipple 34 constituting the outlet for the measured liquid. A port 35 facing the cylinder 20 forms a communication between it and the valve chamber 31, while a similar port 35$^a$ in the opposite side forms a communication between it and the cylinder 20$^a$. A port 36 in the curved wall 37 of the valve chamber forms a communication between the valve chamber 31 and the inlet chamber 30, while a similar port 36$^a$ in the curved wall 37$^a$ of the valve chamber forms a communication between the valve chamber 31 and the outlet chamber 32. An opening 38 in the bottom of the upper-chamber casting 25 adjacent the cylinder 20 serves to connect the valve chamber 31 and said upper chamber, while a similar opening 38ª in the top of the lower-chamber casting 24 adjacent the cylinder 20ª serves to connect said lower chamber and the valve chamber 31. The swinging valve 39 secured on the vertical shaft 40, journaled at its bottom in the bearing 41 in the top of the lower-chamber casting 24 and having its upper end journaled in the bottom of the upper-chamber casting 25, reciprocates through an angle of approximately seventy-two degrees, as shown in Fig. 4, and is stopped at the end of each swing by the abutments 42 and 42ª secured for that purpose in the interior of the valve chamber 31. The curved ends of the valve 39 co-operate with the correspondingly curved walls 37 and 37ª of the valve chamber casting 23, while the top and bottom of the valve 39 co-operate, respectively, with the finished bottom of the upper-chamber casting 25 and the finished top of the bottom-chamber casting 24, a liquid-tight joint being secured in spite of the wear by the structure of the valve 39, as seen in Figs. 6, 7 and 8, to be subsequently described.

Figure 3:
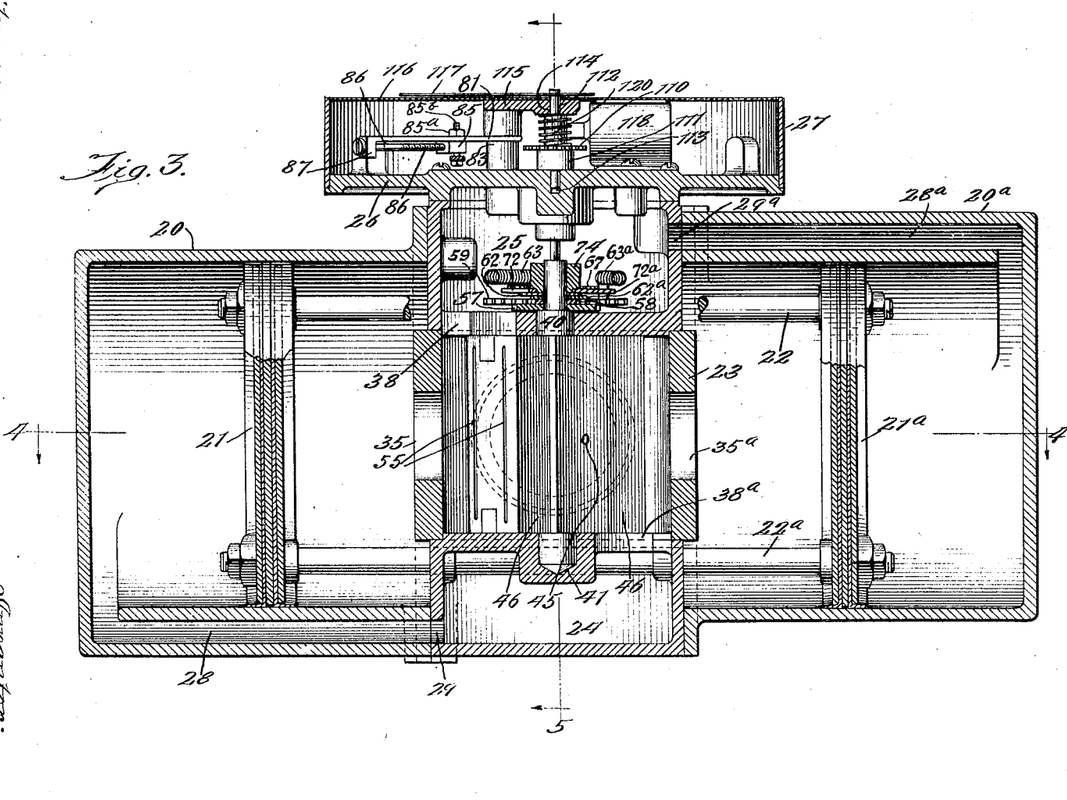
Fig. 3 is a vertical section on the line 3—3 of Figs. 1 and 2.

Referring now to Figs. 3 and 4, the general operation of the meter will be seen to be as follows:

With the valve 39 in the position shown in full lines in Fig. 4, the liquid entering the inlet chamber 30 passes through the port 36 into the valve chamber 31, and in part passes therefrom through the port 35 into the cylinder 20, forcing the piston 21 to the left, and in part passes upward through the opening 38, upper chamber 25, and passage 28ª, into the cylinder 20ª, also forcing the piston 21ª to the left, the two pistons 21 and 21ª, of course, moving in unison, as they are connected by the piston rods 22 and 22ª. At the same time, the liquid already in the cylinder 20 to the left of the piston 21 is forced through the passage 28 into the lower chamber 24, thence upward through the opening 38ª into the valve chamber 31 on the other side of the valve 39 from that through which the entering liquid is flowing, thence through the port 36ª and into the outlet chamber 32, whence it passes through the nipple 34. At the same time the liquid in the cylinder 20ª to the left of the piston 21ª is forced through the port 35ª into the valve chamber 31, and thence through the port 36ª into the outlet chamber 32, whence it passes through the nipple 34. At the end of the movement of the pistons 21 and 21ª to the left, the valve 39 will be shifted to the position shown in dotted lines by the mechanism to be hereinafter described, and the movement of the liquid through the meter will then be as follows:

The liquid entering the valve chamber 31 through the port 36 will divide, part of it passing directly out through the port 35ª into the cylinder 20ª and engaging the piston 21ª to shove it to the right, while the rest of it goes down through the opening 38ª and passage 28 to the cylinder 20 at the left-hand side of the piston 21 to shove it to the right, with the connected piston 21ª. The liquid in the cylinder 20 to the right of the piston 21 is forced through the port 35 into the valve chamber 31, thence to the outlet chamber 32, while the liquid in the cylinder 21 to the right of the piston 21ª is forced upward and backward through the passage 28ª into the upper chamber 25, thence down through the opening 38 into the valve chamber 31, thence through the port 36ª to the outlet chamber 32 to join the liquid coming from the other cylinder 20. At the end of the movement in this direction, the valve 39 is thrown back to the full-line position, and the cycle is repeated. As a definite amount of liquid passes through the meter at each reciprocation of the valve, by registering the number of reciprocations, the amount of liquid delivered can be ascertained.

The valve 39 is preferably constructed as seen in Figs. 6, 7 and 8, and has the central portion consisting of the middle portion 43, square in cross-section, with the two wings 44, pinned to the shaft, as seen at 45, together with the two end portions 46 mounted to slide horizontally on the wings 44, and the top and bottom sections 47, mounted to slide vertically in the channels 48 formed in the middle portion 43 and the wings 44, and in the channels 49. The end portions 46 have the vertical channels 50 therein to accommodate the wings 44, and said wings are pressed yieldingly outward to keep a liquid-tight joint with the curved walls 37 by the helically-coiled expanding springs 51 placed in the recesses 52 bored in the wings, while the top and bottom sections 47 are respectively thrust up and down to keep a liquid-tight joint with the bottom of the upper-chamber casting and with the top of the bottom-chamber casting by the helically-coiled expanding springs 53 placed in the recesses 54 bored in the wings 44 in the bottoms of the channels 48. Shallow grooves 55 are formed in the operating faces of the wings 44, the end portions 46, and may be formed, although not shown, in the top and bottom 47, to improve their action, as such grooves are ordinarily employed in reciprocating pistons.

The mechanism for shifting the valve 39 at the end of the movement of the pistons 21 and 21ª in each direction is enclosed in the upper-chamber casting, and, as best seen in Figs. 3, 5, 9, 10 and 11 is as follows:

The piston rod 22 has formed in one side thereof the shrouded gear-teeth 56, forming in effect a rack bar which meshes with the teeth of a spur gear wheel 57 journaled on the reduced upper end of the shaft 40, and having secured on the top thereof or formed integral therewith a spur gear pinion 58 which meshes with a large spur gear wheel 59 secured upon a vertical rock-shaft 60 journaled at its lower end in the bottom of the upper-chamber casting and extending upward through a stuffing box 61 in the base casting 26, and into the casing 27, as will be hereinafter described. The shaft 40 has pivoted on its reduced upper portion, above the spur gear pinions 58, a pair of arms 62 and 62ª, the outer ends of which are, respectively connected by the helically-coiled contractile springs 63 and 63ª with the eccentrically located pins 64 and 64ª projecting upward from the spur gear wheel 59. Secured at one end upon the lug 65 projecting upward from the upper-chamber casting 25 by the screws 66 is a leaf-spring catch member 67 having an enlarged central portion with the circular aperture 68 through which the upper end of the shaft 40 passes, while toward its free end is a pair of stop abutments 69 and 69ª co-operating alternately with the opposite sides of the central arm 70 of the three-arm trip lever 71 secured on the shaft 40 just above the arms 62 and 62ª, having the outer arms 72 and 72ª adapted to co-operate alternately with the pins 73 and 73ª projecting upward from the arms 62 and 62ª. This trip lever 71 has its three arms 70, 72 and 72ª preferably formed integrally with or rigidly secured to the collar 74 secured on the reduced upper end of the shaft 40 by the set screw 75, so that the reciprocation of the trip lever 71 swings the shaft 40 and its annexed valve 39 through the same angle. The spur gear wheel 59 has projecting upwardly therefrom a pair of pins or lugs 77 and 77ª having their tops beveled and adapted to co-operate with the rounded or beveled end portion 78 of the spring catch 67, as will now be described.

Figure 10:
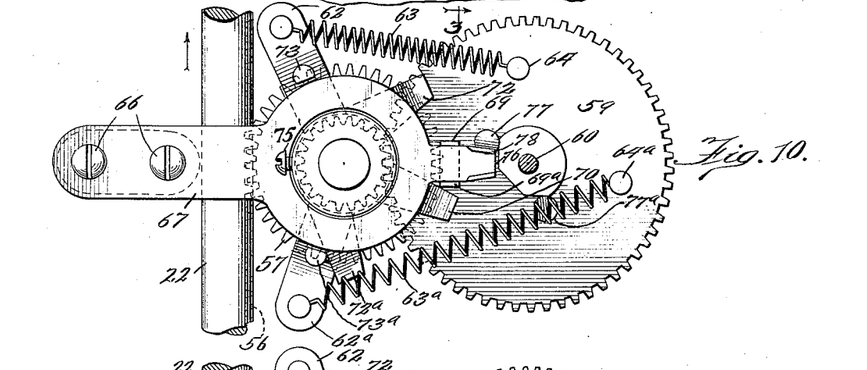
Figs. 10 and 11 are enlarged detail views of a portion of the mechanism shown in Fig. 9, with the tripping mechanism controlling the valve about to operate in the two different positions thereof.
Figure 11:
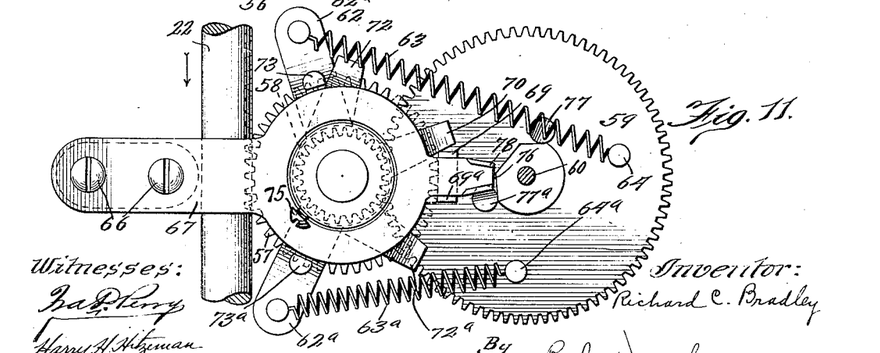

When the parts are in the position shown in Fig. 10, the piston rod 22 has about completed its movement upward (as seen in the figure) and the spring 63ª is strongly tensioned by the resulting movement of the gear wheel 59, the other end of the spring 63ª being held from movement by reason of the pin 73ª engaging the arm 72ª of the lever 71, which in turn is held by reason of its arm 70 engaging the abutment 69ª on the spring catch member 67. As the spur gear wheel 59 continues to move anti-clockwise, the beveled top of the pin 77 engages the end 78 of the spring catch 67, and lifts it enough so that the abutment 69ª is lifted above the plane of the arm 70, so that the latter is free to swing to the position shown in Fig. 11, under the stress of a spring 63ª acting through the pin 73ª engaging the arm 72ª. This swinging movement carries the shaft 40 and the valve 39 to the dotted-line position of Fig. 4, in which the direction of movement of the pistons 21 and 21ª is reversed. The piston rod 22 now moves downward (as seen in Fig. 11, where said downward movement is about completed, and the resulting clockwise movement of the spur gear wheel 59 brings the top of the pin 77ª into position to cam the ends 78 of the spring catch 67 up to release the arm 70 from the abutment 69 and permit the now tensioned spring 63 to bring the arm 70 back to the position shown in Fig. 10, shifting the valve 39 back to the full-line position of Fig. 4.

Figure 1:
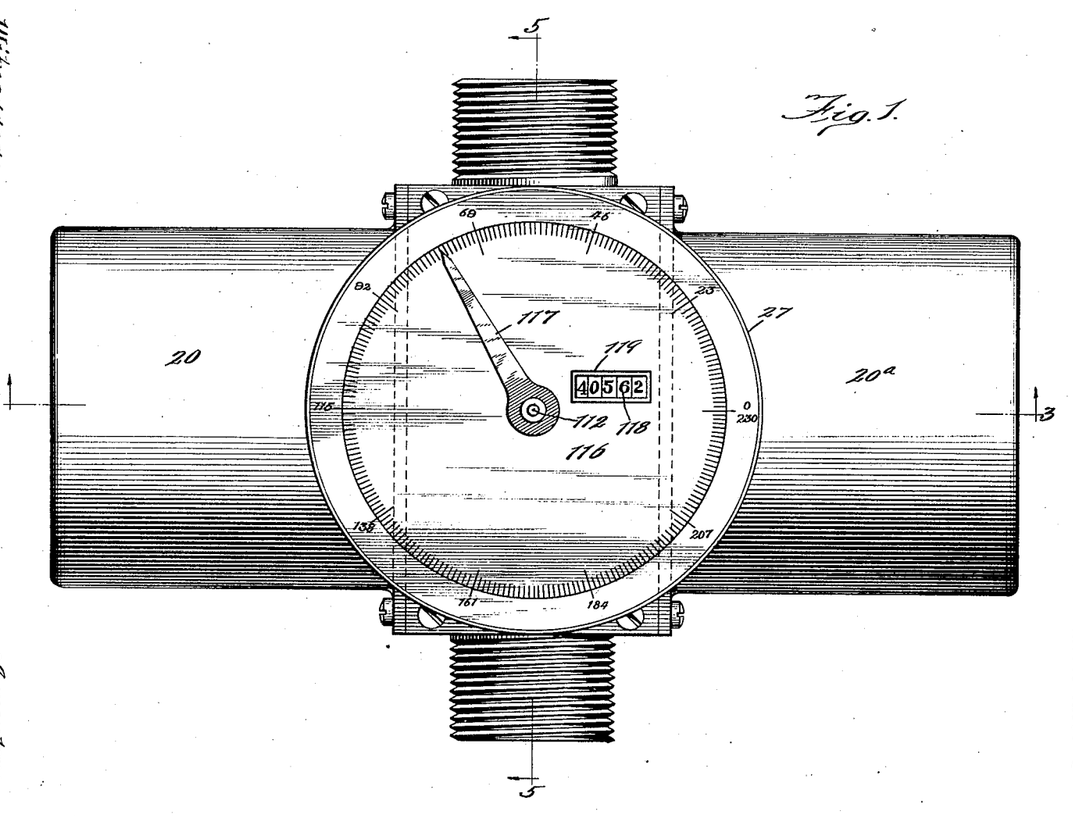
Fig. 1 is a top plan view of a meter embodying my invention.
Figure 2:
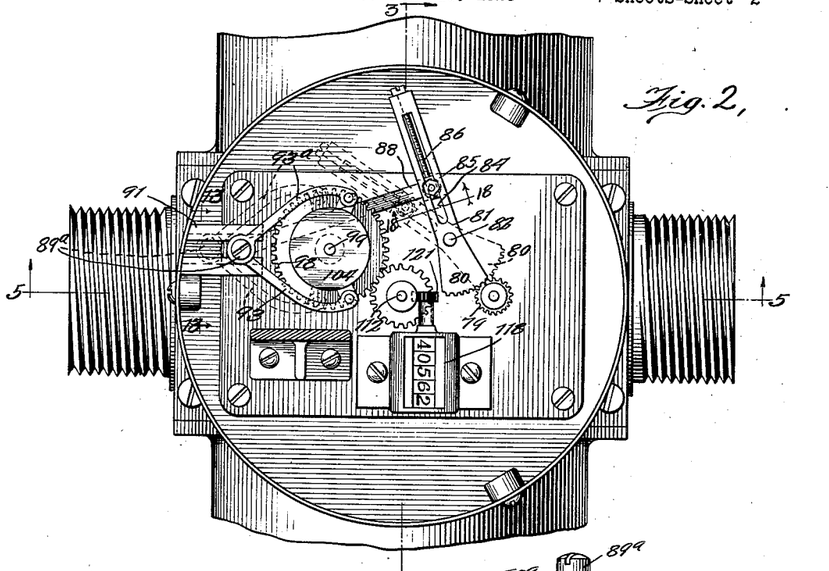
Fig. 2 is a fragmentary, similar view, with the indicator dial and pointer removed.
Figure 5:
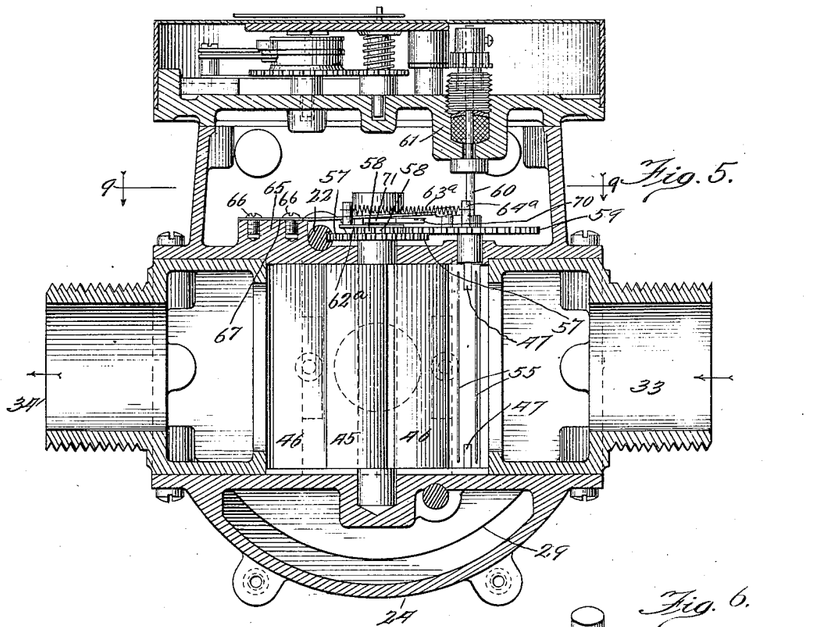
Fig. 5 is a transverse vertical section on the line 5—5 of Figs. 1, 2, 3 and 4.
Figure 14:
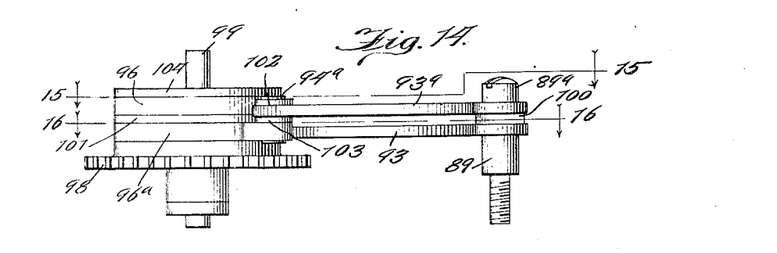
Fig. 14 (Sheet 7) is a side elevation of the clutch mechanism for operating the register seen detached from its associated parts.
Figure 15:
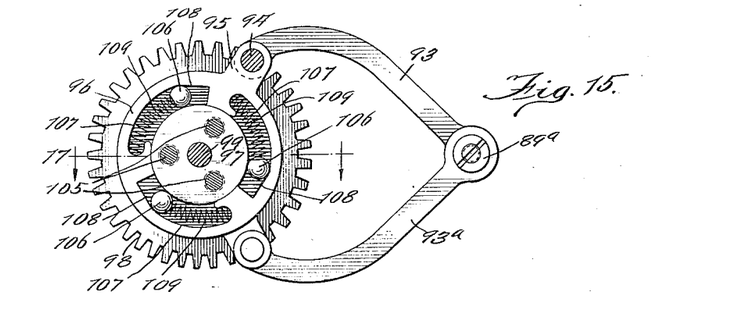
Figs. 15 and 16 are plan views of the same in section on the lines 15—15 and 16—16, respectively, of Fig. 14.
Figure 16:
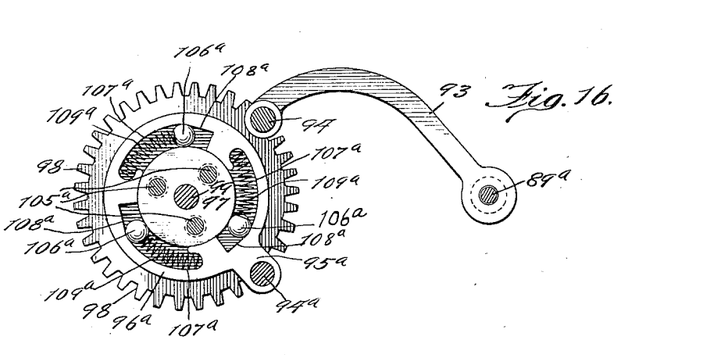
Figure 17:
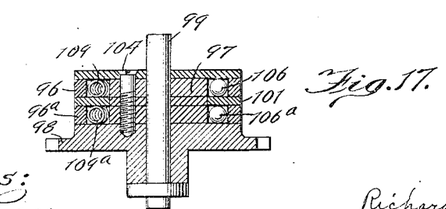
Fig. 17 is a view in vertical section on the line 17—17 of Fig. 15.

As each reciprocation of the pistons and consequent shifting of the valve 39 passes a fixed amount of the liquid through the meter, it will be obvious that registering the movement of the pistons will serve to register the amount of the liquid metered, provided the various elements are properly calibrated. With this end in view, the following mechanism, shown in Figs. 1, 2, 3, 5 and 13 to 17, inclusive, is employed:

The shaft 60 passing up through the stuffing box 61 employed to keep the liquid out of the registering-mechanism casing 27, has secured on its upper end a spur gear pinion 79 meshing with the toothed segmental end 80 of a lever 81 fulcrumed at 82 on a suitable bearing stud 83 formed on the top of the base casting 26. The other end of the lever 81 has the elongated slot 84 therein, in which slides the block 85 through which is threaded the adjusting screw 86 mounted to turn, but not move longitudinally, in the downwardly projecting lug 87 on that end of the lever 81, so that by turning the screw 86 the distance of the block 85 from the fulcrum 82 and the effective length of lever 81 can be adjusted as accurately as may be needed to give an exact registration of the amount of liquid passing through the meter. When the position of the block 85 is adjusted, the nut 85ª is screwed down on the threaded rod 85ᵇ projecting upward from the block 85 to the slot 84, and the block 85 is thus securely clamped on the lever 81, which is engaged on the upper side by the washer 85ᶜ located between the nut 85ª and the lever 81. Pivoted on the under side of the block 85 is one end of a link bar 88, the other end of which is pivoted on the under side of the block 89, having its enlarged lower end 90 adapted to reciprocate in the undercut guideway 91 formed on or secured to the top of the base casting 26, there being a reduced portion 92 in the block 89 where it co-operates with the guideway. As best seen in Figs. 13 to 17, the block 89 is pivotally mounted on the end of the curved link bar 93, the other end of which is pivotally connected by the rivet pin 94 with the arm 95 projecting outwardly from the clutch ring 96 which is mounted to reciprocate on the upper portion 97 of the hub of the spur gear wheel 98 mounted to rotate on the bearing pin 99 secured in and projecting upward from the base casting 26. A washer 100 is placed above the link 93 on the screw 89ª threaded into the top of the block 89, and above the washer is the end of a curved link bar 93ª similar to the bar 93 (but curved in the opposite direction so that the two links can embrace, as it were, the hub of the gear wheel 98 when they are moved to the position shown in full lines in Fig. 2), the other end of which is pivoted to the arm 95ª of the clutch ring 96ª similarly mounted on the hub portion 97, but separated from the clutch ring 96 by the spacing annulus 101, the pivotal connections, as seen in Fig. 14, being preferably formed by a rivet 94ª and the washers 102 and 103. A cap disk 104 secured by the rivets 105 to the hub portion 97 and the spacing annulus 101 serves to hold the clutch balls 106 and 106ª in the recesses 107 and 107ª formed in the clutch rings 96 and 96ª, where they are forced toward the narrowed ends 108 and 108ª of the recesses in which they are located by the helically-coiled expanding springs 109 and 109ª, so that as the links 93 and 93ª are moved to the left in Figs. 16 and 17, causing the clutch ring 96 to move anti-clockwise and the clutch ring 96ª to move clockwise, the clutch ring 96 is operative to move the gear wheel 98 with it anti-clockwise, and the clutch ring 96ª is operative on the return stroke to move the gear with it anti-clockwise, so that the gear wheel 98 is always advanced anti-clockwise, and never goes backward. As seen in Figs. 2, 3 and 5, the spur gear wheel 98 meshes with the spur gear pinion 110 having a large hub 111 secured on the shaft 112 journaled at its lower end in a bearing 113 formed in the base casting 26, and at its upper end in a bearing 114 formed in a bracket 115 suitably secured to the base casting 26. This bracket 115 forms part of a support for the dial 116 forming the top of the register casing and graduated to two hundred and thirty one cubic inches, so that the pointer 117 co-operating therewith and secured on the top of the shaft 112 will show at any instant what fraction of a gallon in cubic inches has been delivered, the complete number of gallons being shown on the wheels of the register of counter 118, visible through the slot 119 in the dial 116. This counter is actuated by the worm 120 secured on the shaft 112 meshing with the worm gear wheel 121 (see Fig. 2) secured on the end of the actuating shaft (not shown) of the counter 118, which may be of any standard type.

The operation of the complete device will be readily apparent from the foregoing description, and while I have shown my invention as embodied by me in the form considered by me when it was designed as best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a liquid meter, the combination with a valve chamber having an inlet port on one side thereof and an outlet port on the opposite side thereof, of upper and lower chambers located respectively above and below the valve chamber and each connected therewith by an opening, a pair of opposed measuring cylinders opening on their inner ends through ports directly to the valve chamber, and one having a passage from its outer end opening into said upper chamber and the other having a similar passage from its outer end opening into the lower chamber, pistons in said cylinders connected to move in unison, a valve in said valve chamber in effect separating it into two halves and adapted to occupy either of two positions alternately, said ports, openings and passages being so designed and located that as the pistons move in either direction, liquid will pass through the liquid inlet port into one half of the valve chamber and thence into both cylinders on one side of the pistons while at the same time the other sides of the pistons are forcing liquid into the other half of the valve chamber and thence through its outlet port, and means including connections between said pistons and valve located in said upper chamber to shift the valve automatically as the limit of the movement of the pistons is reached.

2. In a liquid meter, the combination with a pair of opposed cylinders and pistons co-operating therewith, of a valve chamber, having inlet and outlet ports, interposed between said cylinders and connected by ports with the adjacent ends of said cylinders and by ports and passages with the non-adjacent ends thereof, a piston rod connecting the pistons, a valve pivoted in the valve chamber and adapted to occupy either of two positions, and means for shifting the valve automatically at the end of each stroke of the pistons, consisting of rack teeth on the piston rod, a reciprocating disk, gearing connecting the rack teeth and reciprocating disk, trip mechanism to hold said valve in either position, a pair of springs, each tending to throw said valve from one position to the other, and connected to and alternately tensioned by the movement of the reciprocating disk, and a pair of tripping members carried by the reciprocating disk and serving to release the trip mechanism at the end of each reciprocation of the disk.

3. In a liquid meter, the combination with a plurality of cylinders and a corresponding plurality of pistons co-operating therewith, of a valve chamber having inlet and outlet ports, there being ports and passages connecting both ends of each of the cylinders with the valve chamber, a single valve movable to two positions in said chamber and co-operating with all of said ports and passages opening into the valve chamber, a member, means whereby said member may be reciprocated by the movement of the pistons, said member having two actuating abutments, a trip lever fixed to and moving with the valve, a co-operating catch member normally engaging said lever but released therefrom at the end of each reciprocation by the action of one of the abutments, a pair of springs connected to and alternately tensioned by the reciprocating members, and connections between said springs and the trip lever whereby when the lever is released from the catch member the tensioned spring will move the valve quickly to its other position.

4. In a liquid meter, the combination with a plurality of cylinders and a corresponding plurality of pistons co-operating therewith, of a valve chamber having inlet and outlet ports, there being ports and passages connecting both ends of each of the cylinders with the valve chamber, a single valve movable to two positions in said chamber and co-operating with all of said ports and passages opening into the valve chamber, a piston rod connected with said pistons and having rack teeth thereon, a pinion, means operatively connecting said pinion with said rack teeth, a disk having gear teeth engaging said pinion and having two actuating abutments, a trip lever fixed to and moving with the valve, a co-operating catch member normally engaging said lever but released therefrom at the end of each reciprocation by the action of one of the abutments, a pair of springs connected to and alternately tensioned by the disk, and a pair of lever arms fulcrumed concentrically with the valve shaft and engaging said trip lever alternately and having the springs connected thereto to move the valve quickly to its other position when released from the catch member.

5. In a liquid meter, the combination with a plurality of cylinders and a corresponding plurality of pistons co-operating therewith, of a valve chamber having inlet and outlet ports, there being ports and passages connecting both ends of each of the cylinders with the valve chamber, a single valve movable to two positions in said chamber and co-operating with all of said ports and passages opening into the valve chamber, means for shifting said valve automatically at the end of each stroke of the pistons, a member in said means having a rotary reciprocating movement, a lever reciprocated thereby, a link connected to said lever, means for adjusting the position of the connection for the link on the lever to vary its movement, a pair of clutches, means whereby said clutches may be alternately actuated by the movement of the link, registering devices, and means whereby said registering devices may be actuated by the clutches always in the same direction.

6. In a liquid meter, the combination with a plurality of cylinders and a corresponding plurality of pistons co-operating therewith, of a valve chamber having inlet and outlet ports, there being ports and passages connecting both ends of each of the cylinders with the valve chamber, a single valve movable to two positions in said chamber and co-operating with all of said ports and passages opening into the valve chamber, means for shifting said valve automatically at the end of each stroke of the pistons, a member in said means having a rotary reciprocating movement, a lever reciprocated thereby, a link connected to said lever, a pair of curved links connected to the free end of the first mentioned link, a pair of clutch rings having oppositely directed arms connected to the curved links, said clutch rings being provided with recesses, a toothed disk having a hub upon which the clutch rings are mounted, and spring-pressed balls in the recesses of the clutch rings and co-operating with the recesses in the clutch rings and with the hub to alternately advance the toothed disk always in the same direction.

7. In a liquid meter, the combination with a plurality of cylinders and a corresponding plurality of pistons cooperating therewith, of a valve chamber having inlet and outlet ports, there being ports and passages connecting both ends of each of the cylinders with the valve chamber, a single valve movable to two positions in said chamber and co-operating with all of said ports and passages opening into the valve chamber, means for shifting said valve automatically at the end of each stroke of the pistons, a member in said means having a rotary reciprocating movement, a lever reciprocated thereby, a link connected to said lever, a pair of curved links connected to the free end of the first mentioned link, a pair of clutch rings having oppositely directed arms connected to the curved links, said clutch rings being provided with recesses, a toothed disk having a hub upon which the clutch rings are mounted, spring-pressed balls in the recesses of the clutch rings and co-operating with the recesses in the clutch rings and with the hub to alternately advance the toothed disk always in the same direction, a shaft, a gear pinion secured on said shaft and moving with the toothed wheel, a worm on the pinion shaft, a worm gear driven by the worm, a countershaft upon which the worm gear is secured, a register actuated by said countershaft, a pointer on the pinion shaft, and a graduated dial with which the pointer co-operates.

8. In a liquid meter, the combination with a centrally located valve-chamber casting having centrally located bearings therein for a vertical valve shaft and six ports opening into the valve chamber, one each on the top and bottom and the four sides, of a reciprocating valve having its shaft journaled in said bearings and co-operating with the four side ports to connect them alternately, measuring cylinders having their outer ends closed but connected by passages, one with the top port and the other with the bottom port, and having their inner ends connected directly to the adjacent two side ports, connected pistons in said cylinders, and means for automatically shifting said valve at the end of the piston strokes.

9. In a liquid meter, the combination with a centrally located valve-chamber casting having centrally located bearings therein for a vertical valve shaft and six ports opening into the valve chamber, one each on the top and bottom and the four sides, of a reciprocating valve having its shaft journaled in said bearings and co-operating with the four side ports to connect them alternately, measuring cylinders having their outer ends closed but connected by passages, one with the top port and the other with the bottom port, and having their inner ends connected directly to the adjacent two side ports, connected pistons in said cylinders, and means for automatically shifting said valve at the end of the piston strokes, said means including connections between the pistons.

10. In a liquid meter, the combination with a centrally located valve-chamber casting having centrally located bearings therein for a vertical valve shaft and six ports opening into the valve chamber, one each on the top and bottom and the four sides, of a reciprocating valve having its shaft journaled in said bearings and co-operating with the four side ports to connect them alternately, top and bottom chambers respectively above and below the valve chamber and connected thereto by the top and bottom ports, inlet and outlet chambers on opposite sides of the valve chamber and connected thereto by two of the side ports, measuring cylinders on opposite sides of the valve chamber and between the inlet and outlet chambers and having their outer ends closed but connected by passages, one with the top chamber and the other with the bottom chamber, and having their inner ends connected directly to the adjacent two side ports, connected pistons in said cylinders, and means for shifting said valve at the end of the piston strokes.

11. In a liquid meter, the combination with a centrally located valve-chamber casting having centrally located bearings therein for a vertical valve shaft and six ports opening into the valve chamber, one each on the top and bottom and the four sides, of a reciprocating valve having its shaft journaled in said bearings and co-operating with the four side ports to connect them alternately, top and bottom chambers respectively above and below the valve chamber and connected thereto by the top and bottom ports, inlet and outlet chambers on opposite sides of the valve chamber and connected thereto by two of the side ports, measuring cylinders on opposite sides of the valve chamber and between the inlet and outlet chambers and having their outer ends closed but connected by passages, one with the top chamber and the other with the bottom chamber, and having their inner ends connected directly to the adjacent two side ports, connected pistons in said cylinders, and means for shifting said valve at the end of the piston strokes, said valve-shifting means being located in said top chamber.

12. In a liquid meter, the combination with a centrally located valve-chamber casting having centrally located bearings therein for a vertical valve shaft and six ports opening into the valve chamber, one each on the top and bottom and the four sides, of a reciprocating valve having its shaft journaled in said bearings and co-operating with the four side ports to connect them alternately, top and bottom chambers respectively above and below the valve chamber and connected thereto by the top and bottom ports, a pair of measuring cylinders having their outer ends closed but connected by passages, one with the top chamber and the other with the bottom chamber, and having their inner ends connected directly to the two adjacent side ports, connected pistons in said cylinders, means for automatically shifting said valve at the end of the piston strokes, a registering mechanism chamber above the top chamber, and registering mechanism in said registering mechanism chamber actuated by the reciprocation of the pistons.

13. In an automatic shifting mechanism, the combination with a member to be rotatably reciprocated, of a rotatably reciprocating member having two actuating abutments, a trip lever fixed to the member to be reciprocated, a co-operating catch member normally engaging said lever but released therefrom at the end of each reciprocation of the abutment carrying member by the action of said abutments, a pair of springs connected to and alternately tensioned by the abutment-carrying reciprocating member, and connections between said springs and the trip lever whereby when it is released from the catch member, the tensioned spring will move it quickly to the other position.

14. In an automatic shifting mechanism, the combination with a member to be rotatably reciprocated, of a rotatably reciprocating member having two actuating abutments, a trip lever fixed to the member to be reciprocated, a cooperating catch member normally engaging said lever but released therefrom at the end of each reciprocation of the abutment carrying member by the action of said abutments, a pair of springs connected to and alternately tensioned by the abutment-carrying reciprocating member, and a pair of lever arms fulcrumed concentrically with the member to be reciprocated and engaging said first mentioned trip lever alternately and having said springs connected thereto to move said member to be reciprocated quickly to its other position when it is released from the catch member.

In witness whereof I have hereunto set my hand this 27th day of December, 1927.

RICHARD C. BRADLEY.